United States Patent [19]

Okabe et al.

[11] 4,342,136

[45] Aug. 3, 1982

[54] APPARATUS FOR FASTENING INSIDE HANDLE COVER TO AUTOMOBILE DOOR

[75] Inventors: Kanae Okabe, Hiroshima; Hiroo Murayama, Yokohama, both of Japan

[73] Assignees: Yuhshin Co., Ltd., Minato; Nifco Inc., Yokohama, both of Japan

[21] Appl. No.: 170,440

[22] Filed: Jul. 22, 1980

[30] Foreign Application Priority Data

Jul. 23, 1979 [JP] Japan .............................. 54-100541[U]

[51] Int. Cl.$^3$ ............................................... A47B 95/02
[52] U.S. Cl. ..................................... 16/115; 292/113
[58] Field of Search ............. 292/DIG. 37, 113, 336.3, 292/337, DIG. 53; 411/57, 44, 45; 16/115

[56] References Cited

U.S. PATENT DOCUMENTS

| | | | |
|---|---|---|---|
| 2,393,606 | 1/1946 | Brush | 411/57 |
| 3,147,525 | 9/1964 | Texier | 411/44 |
| 3,226,150 | 12/1965 | Menzer | 411/57 X |
| 3,508,778 | 4/1970 | Legge et al. | 292/DIG. 31 |
| 4,054,307 | 10/1977 | Carella | 292/336.3 X |
| 4,088,054 | 5/1978 | Lippacher et al. | 411/57 |

Primary Examiner—Andrew V. Kundrat
Attorney, Agent, or Firm—Jerold M. Forsberg; Thomas W. Buckman; Jack R. Halvorsen

[57] ABSTRACT

An apparatus for fastening an inside handle cover to an automobile door comprises an engaging leg integrally extended from the lower surface of a bottom plate of the cover, adapted to be brought into engagement with a hole bored in advance in a panel of an automobile body and having an insertion hole perforated along the axis thereof and ridges formed on the inner wall surface of the insertion hole, and a pin provided on the outer wall surface thereof with screw threads and adapted to be inserted into the insertion hole of the engaging leg; and facilitates the fastening of the cover to the automobile door and thereby improves the work involved and, at the same time, enables the cover fastened to the automobile body to be removed by a simple manipulation.

5 Claims, 4 Drawing Figures 4,342,136

APPARATUS FOR FASTENING INSIDE HANDLE COVER TO AUTOMOBILE DOOR

BACKGROUND OF THE INVENTION

This invention relates to an apparatus for fastening an inside handle cover (escutcheon) to the inner side of an automobile door. Particularly, this invention aims to provide an apparatus for fastening the cover to the automobile door, which facilitates the fastening of the cover for improvement of the efficiency of the work involved and, at the same time, enables the cover fastened to the automobile door to be removed by a simple manipulation.

Generally the cover (escutcheon) for the inside handle is fastened such as with tapping screws to an inner panel of the door or to a panel on which the inside handle base is to be fixed. Since most covers of this type are fastened to such a panel as accommodating inside handles therein, they are generally produced in the shape of dishes. In fastening such a cover to the panel, the tapping screws must be driven through the bottom of the recess of the cover into the inner panel or the panel on which the inside handle base is fixed. Turning the tapping screws on the bottom of the recess of the cover, particularly beyond the inside handle, proves to be a highly troublesome work. Improvement in the cover, therefore, has been in demand.

The conventional inside handle cover is used solely for the purpose of concealing the device portion of the inside handle and its adjacent door interior parts and imparting a decorative effect to the appearance of the region involved. The base to which the inside handle is pivotally attached freely swingably thereon is separately made of sheet metal and attached as the base for the inside handle to the inner panel. It is intended to provide strength for the inside handle to withstand the operational load exerted thereon and permit absorption of possible positional deviation. Use of the inside handle cover having such a base represents an addition to the number of positions of fixing and proves disadvantageous from a viewpoint of assembly work. Improvement in this respect is also in demand.

SUMMARY OF THE INVENTION

An object of this invention is to provide an apparatus for fastening an inside handle cover to an automobile door, which facilitates the fastening of the cover to the inner panel of the door and thereby improves the work involved and, at the same time, enables the cover fastened to the inner panel to be removed with a simple manipulation.

Another object of this invention is to provide an apparatus for fastening the cover to the automobile body, which permits the fastening of the inside handle cover to the inner panel to be concurrently accomplished with the fastening of the whole apparatus so as to decrease the number of positions of fixing and further improve the operational efficiency of the apparatus.

To attain the objects described above, according to the present invention, there is provided an apparatus for fastening an inside handle cover to an automobile door, which comprises an engaging leg integrally extended from the lower surface of a bottom plate of the inside handle cover. An insertion hole is perforated straight along the axis thereof from the upper surface of the bottom plate to the tip of the engaging leg. The leg adapted to be brought into engagement with a hole bored in advance in a panel of the automobile door. A pin is adapted to be inserted into the insertion hole downwardly from the upper surface side of the bottom plate. Ridges are formed on the inner wall surface of the insertion hole close to the opening on the bottom plate side. Screw threads are formed on the outer wall surface of the pin whereby forced insertion of the pin into the insertion hole causes the engaging leg to be diverged below the lower surface of the panel and consequently permits the inside handle cover to be fastened to the panel. Rotation imparted to the pin causes the pin to be extracted from the insertion hole and consequently permits the inside handle cover to be released from the panel.

Other objects and characteristic features of this invention will become apparent from the description to be given hereinafter in detail with reference to the accompanying drawing.

DESCRIPTION OF PREFERRED EMBODIMENTS

Figure 1:
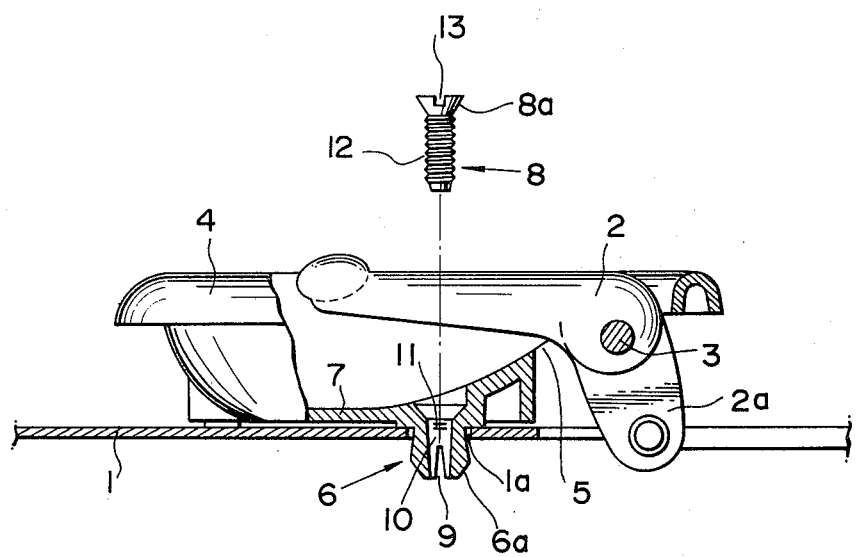
FIG. 1 is a partially cut-away front view of one embodiment of the apparatus according to the present invention, with the essential part thereof shown in cross section.

Now, the present invention will be described below with reference to the illustrated embodiments. FIG. 1 is a partially cut-away front view of one embodiment of the apparatus according to this invention. The numeral 1 denotes an inner panel of an automobile door with an inside handle which is connected to a door lock mechanism (not shown) and is adapted so that a rotation imparted thereto enables the door lock to be released. A cover 4 which accommodates the inside handle dish shaped and permits the leg portion 2a of the inside handle to pass through, an opening formed therein. The inside handle rotatably pivots at the base thereof on a fulcrum 3 and, at the same time, overlies the front surface of the inner panel. An engaging leg 6 which is integrally extended from the lower surface of he bottom plate 7 of the cover 4 and is adapted to be inserted into a hole 1a bored in the inner panel 1. A pin 8 serves to secure the engaging leg in the hole 1a.

Figure 2:
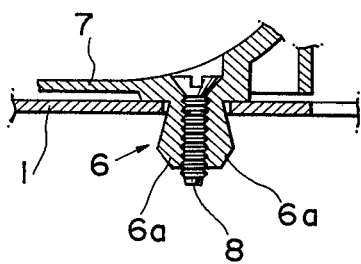
FIG. 2 is a sectioned view of the essential part of the apparatus of FIG. 1, with the pin driven home into tight engagement.

The engaging leg 6 is molded integrally with the cover 4 and is made of a thermoplastic synthetic resin. In the embodiment shown in FIGS. 1-2, the leg provided with two prongs 6a, 6a separated from each other extending by a slit 9 inserted longitudinally upwardly from the forward end of the leg. An insertion hole 10 is perforated along the axis of the leg from the upper surface of the bottom plate 7 of the cover to the tip of the leg.

The diameter of the insertion hole 10 is roughly equal, at the opening thereof on the bottom plate side, to the diameter of the pin 8 and is gradually decreased in the manner of a taper in the direction of the tip of the leg. On the inner wall of the insertion hole close to the upper opening mentioned above, ridges 11 are intermittently arranged in a helical direction on surfaces opposed to each other across the axis of the perforated insertion hole.

The pin 8 is molded of the same thermoplastic synthetic resin as the cover 4, and the shank thereof with the exception of the head portion 8a and the leading end is generally cylindrical. On the peripheral surface of this shank, screw threads 12 are formed in the same helical direction as the ridges 11 formed on the inner wall surface of the aforementioned insertion hole 10.

The assembly of the apparatus to the door panel is as follows: the handle cover 4 of the construction described above is attached the inside handle 2 through the medium of the fulcrum 3. Thereafter, the bottom plate 7 is placed along the inner panel 1 and the engaging leg 6 is inserted into the hole 1a bored in advance in the inner panel. Then, from the handle cover side, the pin 8 is poised in alignment with the insertion hole 10 formed through the axis of the engaging leg 6 and it is driven into the insertion hole 10 with the pressure applied to the head portion 8a, completing the attachment of the inside handle device to the inner panel 1. Consequently, the fastening of the inside handle cover concurrently accomplished the fastening of the whole apparatus. This means that the fastening of the whole apparatus to the automobile door is achieved at this one position. In this case, since the insertion hole 10 has its inside diameter decreased in the direction of the tip of the leg as described above, the insertion of the pin 8 causes the prongs 6a, 6a to be diverged below the lower surface of the panel 1, with the result that the outer surfaces of the prongs are pressed against and consequently brought into rigid engagement with the edge of the hole 1a. Although this construction permits no adjustment in the position of fixing, this inconvenience can be coped with by the freedom enjoyed in the field adjustment of the length of the rod to be connected to the door lock mechanism (not shown). Since the pin 8 which is to be driven into the insertion hole has the screw threads 12 formed on the peripheral surface of its shank, it is subject to the resistance offered by the ridges 11 formed on the inner wall surface in the upper portion of the insertion hole. However, because the two components involved here are molded of a synthetic resin and the ridges 11 are formed intermittently on the inner wall surface and further because the inner shape of the insertion hole has more or less allowance for deformation, the screw threads are allowed to ride over the ridges 11 during the forced insertion of the pin. The pin, consequently, is allowed to be driven home in the insertion hole. When the pin 8 is completely received in the insertion hole 10, the screw threads 12 are brought into fast engagement with the ridges 11. When the pin 8 is rotated around its axis, the screw threads slide along the ridges 11 as the guide and, as a result, the pin 8 is extracted from the insertion hole 10 and the engaging leg 6 is released from the panel. An engaging groove 13 is formed on the head portion 8a of the pin for admitting the tip of a screw driver or some other suitable tool to be used for imparting the aforementioned rotation to the pin 8.

Figure 3:
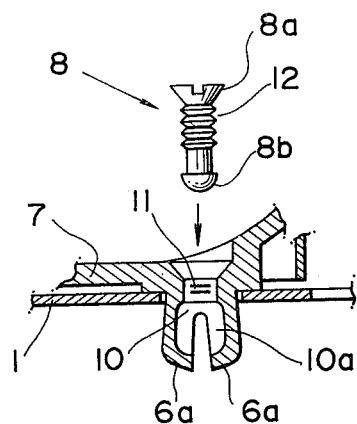
FIG. 3 is a sectioned view of the essential part of the apparatus of another embodiment according to this invention.
Figure 4:
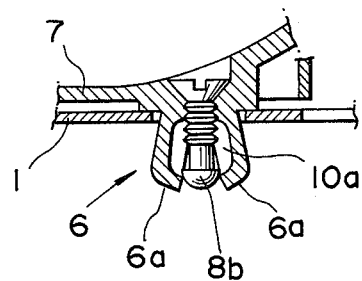
FIG. 4 is the sectioned view of FIG. 3, with the pin driven home into tight engagement.

FIGS. 3 and 4 illustrate another embodiment of the apparatus according to the present invention. The embodiment illustrated therein has the insertion hole 10 in the engaging leg 6 and the pin 8 formed in shapes partially different from the shapes of the corresponding components in the preceding embodiment, so that the pin 8 is held in temporary engagement in advance with the insertion hole while the engaging leg is being inserted into the hole 1a in the panel. The pin 8 has simply to be driven home in the insertion hole to accomplish the fastening of the engaging leg to the panel. The insertion hole 10 is provided halfway in the length of the engaging leg with an enlarged portion 10a, while the pin 8 is provided at the leading end thereof with an expanded portion 8b having a diameter slightly greater than the inside diameter of the opening in the upper part of the insertion hole 10. In the part between the expanded portion and the middle of the length of the shank, the pin 8 has a diameter smaller than the inside diameter of the aforesaid opening. The expanded portion 8b of the pin 8 is inserted in the insertion hole 10 and received in advance in the enlarged portion 10a, so that the pin is held in temporary attachment to the engaging leg.

After the pin has its leading end brought into temporary engagement with the insertion hole as described above, the engaging leg 6 of the cover is inserted into the hole 1a of the inner panel in the same manner as in the preceding embodiment. Thus, the pin is driven home in the insertion hole with a pressure applied to the head portion thereof, with the result that the prongs 6a, 6a into which the engaging leg is divided are diverged and the engaging leg is brought into rigid engagement with hole 1a. To ensure the aforementioned divergence of the leg pieces in the present embodiment, the inside diameter at the lower-end opening of the insertion hole, namely the gap between the leading ends of the prongs 6a, 6a, is smaller than the diameter of the aforementioned expanded portion of the pin, so that the forced insertion of the pin enables the expanded portion 8b to wedge its way into the narrow gap and permits the prongs to be diverged below the lower surface of the panel 1. Further in the present embodiment, the insertion hole 10 is provided on the inner wall close to the upper-end opening with ridges 11 formed intermittently in a helical direction similarly to the preceding embodiment, and, the pin 8 is provided on the shank thereof with screw threads 12 formed in the same helical direction. Consequently, the pin 8 driven home in the insertion hole can be extracted by a rotation imparted to the pin.

In any case, since the engaging leg is forcibly expanded radially by the pin, the removal of the pin by the rotation imparted thereto is facilitated by the force of resilient recovery which the engaging leg exerts in the direction of pushing the pin upwardly.

This invention has been described with reference to two preferred embodiments. As is evident from the construction of the invention described above, the apparatus of this invention can be fastened to the panel by a procedure of inserting the engaging leg extended from the lower surface of the cover into the hole bored in advance in the panel and then pressing the pin into the insertion hole bored along the axis of the engaging leg. Thus, it can be fastened much more easily than the conventional apparatus which makes use of tapping screws, for example. This invention, therefore, is highly effective in improving the operational efficiency of the fastening. Further, in the apparatus of this invention, the cover which has been fastened by the insertion of the pin can easily be removed when necessary because the engaging leg held in rigid engagement with the hole of the panel is released from the engagement by removing the pin from the insertion hole by the rotation imparted thereto. Refastening of the cover to the panel can readily be accomplished by repeating the aforementioned procedure for the insertion of the pin.

In the conventional apparatus, the apparatus proper is fastened to the inner panel through the medium of the handle base adapted to retain in position the inside handle and the inside handle cover is separately fastened to the aforementioned handle base or the inner panel. In contrast, in the apparatus of this invention, the inside handle cover inclusive of the handle base is molded integrally with the engaging leg so that all the components are retained in position by the inside handle cover. Thus, the fastening of the apparatus to the automobile door is accomplished by the one-point fixing with the engaging leg. In this respect, accordingly, this invention provides decisive improvement in the operational efficiency of the fastening. Moreover, the adoption of the aforementioned rigid engaging means which obviates the necessity for adjustment in the fastening operation precludes otherwise possible loss of strength.

In the embodiments cited above, the engaging leg 6 extended from the lower side of the handle cover 4 is divided into prongs with the slit 9 inserted upwardly from the lower end of the leg and the insertion hole formed along the axis of the engaging leg is perforated past the end of the leg. The formation of these leg pieces and the perforation of the insertion hole are both intended to facilitate the radial expansion of the engaging leg due to the forced insertion of the pin 8. So far as this particular purpose is concerned, the engaging leg is not necessarily limited to the type having the lower end split by a slit. Another method available for this purpose makes use of an apparatus wherein the engaging leg is formed in a somewhat greater length and is provided with slits inserted in the longitudinal direction over a certain midway portion of the entire length of the leg and an insertion hole is formed in a blind form inside the engaging leg to a depth beyond the bounds of the slits. With this apparatus, the barrel portion of the engaging leg can be radially expanded by forcibly inserting the pin downwardly into the insertion hole from the upper end thereof. The fastening of the apparatus to the hole bored in advance in the panel can be likewise accomplished by this radial expansion of the engaging leg.

In the embodiments cited above, the screw threads on the pin and the ridges in the insertion hole for admitting the engaging leg are both formed in the helical direction. The purpose of these projections can be attained by having either the former or the latter set of projections formed in the helical direction. The same effect can be obtained even when the ridges are formed in a horizontal direction, for example. In the embodiments, the ridges are formed in an intermittent manner on the surfaces opposed to each other. They are so designed by reason of the convenience of molding and in due consideration of the strength with which the ridges are engaged with the pin. Optionally, they may be formed in an annular form.

What is claimed is:

1. In combination, a door handle cover with an integrally formed expandable fastener means extending therefrom adapted to be inserted through a preformed aperture in an automobile door panel, and a generally cylindrical headed pin adapted to be driven into engagement with the fastener means without rotation to thereby expand the fastener means, said pin and said fastener means adapted to cooperate with one another whereby rotation of the pin causes axial displacement thereof; said fastener means comprising a body having an upper end generally coinciding with a portion of the door handle cover and a lower end adapted to be inserted in the aperture and radially expanded, the body having an axial opening extending therethrough with one end of the opening disposed at the upper end of the body defining a first diameter and the other end of the opening at the distal end of the lower end defining a second diameter, the first diameter being substantially greater than the second diameter, the lower end of the body having a plurality of slots dividing the lower end into radially flexible prongs, the upper end of the body having inwardly directed protrusions intermittently disposed about the circumference of its axial opening defining a first set of ridges of limited axial extent; the pin having a head and a shank with radially outwardly extending protrusions defining a second set of ridges, one of said sets of ridges helically disposed, said second set of ridges on said pin having a major diameter substantially equal to said first diameter to positively engage said first set of ridges with said second set of ridges, whereby said door handle cover is easily installed in said automobile door panel by inserting the lower end of said fastener in said preformed aperture and axially driving said pin by impacting one end thereof to radially expand and thereby secure the cover to the panel, and whereby the cover is easily removed by axial displacement of the pin due to rotation thereof and withdrawal of the lower end.

2. The combination of claim 1 wherein the door handle cover includes a pivoting door handle having first and second positions, wherein when said handle is in one of said positions access to the fastener means is limited.

3. The combination of claim 1 wherein the first and second sets of ridges are of a mating helical configuration.

4. The combination of claim 1 wherein the body includes an intermediate section between the upper end and the distal end of the lower end, the opening in said section having an inside diameter substantially larger than the first diameter, said generally cylindical headed pin including a first shank section adjacent the head of said pin having the second set of ridges thereon wherein said ridges define said major diameter, a second shank section adjacent the first shank section having a diameter less than the major diameter, and a third shank section adjacent the second shank section having a diameter substantially equal to the major diameter, said pin having an axial extent such that the third section engages and expands but does not completely penetrate the distal end of the lower end of the body, whereby the third section is contained within said intermediate section preventing removal of said pin from said body.

5. The combination of claim 1 wherein the pin includes an enlarged end and the body includes an enlarged section between the upper end and the lower end, said pin having an axial extent such that the enlarged end engages and expands but does not completely penetrate the distal end of the lower end of the body.

* * * * *